United States Patent [19]

Lindquist

[11] Patent Number: 4,572,450
[45] Date of Patent: Feb. 25, 1986

[54] METHOD AND APPARATUS FOR SIMULTANEOUSLY LOADING A PLURALITY OF TAPE CASSETTES

[75] Inventor: Kenneth L. Lindquist, Holden, Mass.

[73] Assignee: Polaroid Corporation, Cambridge, Mass.

[21] Appl. No.: 645,553

[22] Filed: Aug. 30, 1984

[51] Int. Cl.$^4$ .................. B65H 69/06; B65H 19/20; B31F 5/06
[52] U.S. Cl. ................................ 242/56 R; 242/58.5; 156/159
[58] Field of Search .................... 242/56 R, 583, 58.4, 242/58.5, 56.1, 56.2, 56.6; 156/157, 159, 304.1, 502, 505, 506

[56] References Cited

U.S. PATENT DOCUMENTS

| | | | |
|---|---|---|---|
| 2,664,139 | 12/1953 | Speed | 156/505 X |
| 3,314,844 | 4/1967 | Hadley | 156/505 X |
| 3,870,584 | 3/1975 | Jores | 156/159 X |
| 4,033,521 | 7/1977 | Dee | 242/56.2 X |
| 4,061,286 | 12/1977 | King, Sr. et al. | 242/56 |
| 4,062,719 | 12/1977 | Masuzima | 156/506 X |
| 4,175,999 | 11/1979 | Schoettle et al. | 156/505 |
| 4,204,898 | 5/1980 | King | 156/159 |
| 4,332,355 | 6/1982 | Zopfy | 242/58.4 X |
| 4,497,454 | 2/1985 | Woodley | 242/58.3 X |
| 4,501,630 | 2/1985 | Kiuchi | 156/505 X |

Primary Examiner—Stuart S. Levy
Assistant Examiner—Lloyd D. Doigan
Attorney, Agent, or Firm—John J. Kelleher

[57] ABSTRACT

An inventory minimizing method and apparatus for simultaneously loading elongated, relatively narrow tapes into a plurality of preleadered tape-handling cassettes. A roll of web tape many times wider than the width of an individual cassette tape is progressively formed into a plurality of narrow width composite web tapes consisting of a series of longitudinally spaced-apart tapes, of predetermined length, that have adjacent end portions attached to one another by means of an adhesive web tape connecting splice-tape. The leader material of a preleadered cassette is attached to each end of one of the tapes in a composite tape in the following manner. The cassette tape leader is severed into two separate smaller leader lengths with an end of each such smaller length remaining attached to one of two intenal cassette spools. One of the short lengths of tape of a composite tape is removed from the composite tape by severing the adhesive splice-tapes at opposite ends thereof into two separate portions such that an adhesive surface of each severed splice tape portion forms an adhesive lip that extends beyond the tape length to which it is adhesively attached. A surface of each of the severed tape leader ends is then respectively pressed against an adhesive surface of one of the adhesive lips extending from opposite ends of a short length of tape, with portions of the short length of tape and the attached leader material being wound onto a cassette spool after each leader is adhesively attached to its respective tape end. This leader attaching process is duplicated for other cassettes being loaded with tape at the same time and repeated for subsequently loaded cassettes.

6 Claims, 14 Drawing Figures

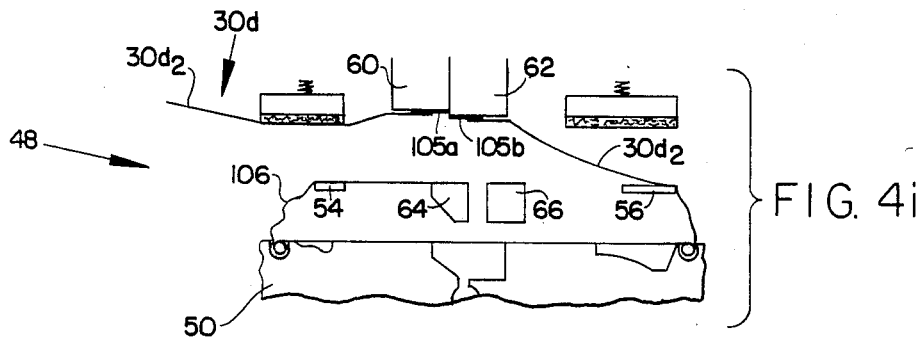
FIG. 4i
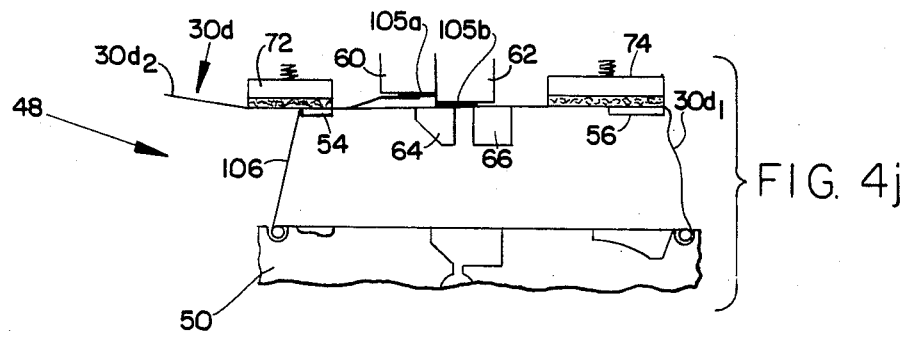
FIG. 4j
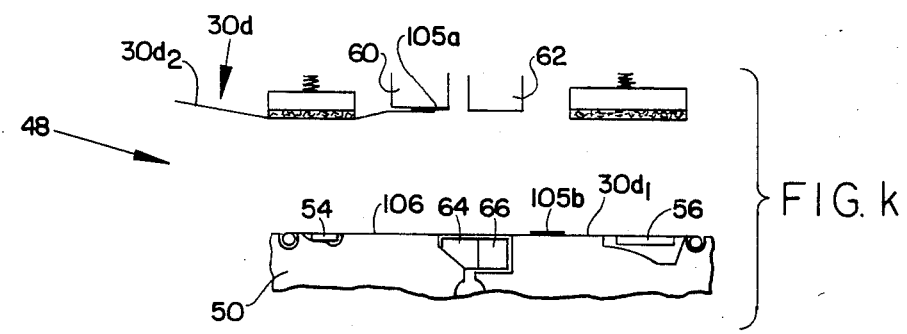
FIG. k

METHOD AND APPARATUS FOR SIMULTANEOUSLY LOADING A PLURALITY OF TAPE CASSETTES

BACKGROUND OF THE INVENTION

The present invention relates to an improved method and apparatus for attaching leader material to a length of tape, in general, and to simultaneously attaching cassette-spool attached leader material to lengths of tape and loading the said leadered tape lengths into a plurality of cassettes, in particular.

In order to effectively compete in the marketplace, tape handling cassettes must be loaded with specific lengths of tape at relatively high rates of speed by automatic cassette loading equipment requiring minimum machine operator involvement with the tape loading process. An automatic preleadered cassette tape loading machine that operates in such a manner, designated the VL-600 Video Loader, is presently available from the Otari Electric Co., Ltd. of Tokyo, Japan. Cassette loading equipment of this type automatically place short lengths of leader material on both ends of the tape and loads a specific length of tape with leader material attached thereto into a tape-handling cassette.

One fairly common technique employed to increase the rate at which tape handling cassettes are loaded with leadered tape by automatic cassette loading equipment is to employ empty tape cassettes having the proper length of leader material wound onto a pair of tape-handling spools rotatably mounted within the tape cassette housing. In such cassettes, approximately one-half of the leader material is wound on each of the cassette spools that are otherwise empty of tape or other tape related materials. The technique of using preleadered cassettes is a technique that is employed in the above-mentioned Otari tape-loading machine.

Cassette loading equipment such as the Otari machine mentioned above automatically attaches leader material, already wound on a pair of spools within a cassette, to a measured length of magnetic tape by means of a small piece of adhesive tape of a predetermined size automatically die cut from a roll of such tape at the appropriate time in the cassette-loading cycle. The leader material is attached by mechanically raising the center portion of the leader out of its cassette so that the leader may be severed into two separate lengths with each severed length having an end attached to a different rotatably mounted cassette spool. The free end of one severed leader length is laterally moved into linear alignment and butting engagement with a free end of a large reel of magnetic tape and then a small piece of die cut adhesively coated splice-tape is aligned with and is subsequently employed to adhesively attach a severed leader length to said free magnetic tape end. After a measured length of tape together with its adhesively attached leader has been wound onto one cassette spool, it is severed from the large reel of tape and then adhesively attached to the remaining spool-attached severed leader length in the same manner that the first-mentioned length of leader material was attached to the opposite end of the tape previously wound onto the other cassette spool.

Disadvantages associated with Otari-type automatic cassette loading equipment include the necessity of maintaining relatively large inventories of large diameter reels of narrow width magnetic tape that must be manually loaded into said equipment and the difficulty of avoiding excessive linear misalignment between tape and leader and between the adhesive tape and the leader and/or the magnetic tape. Excessive misalignment of the tape or tapes can, for example, produce friction loading between the tape and tape-reel that may prevent the tape drive from moving the tape past the magnetic head of a tape recorder at the required tape speed.

A primary object of the present invention, therefore, is to provide an improved method and apparatus for simultaneously loading leadered tape into a plurality of tape cassettes.

Another object of the present invention is to provide an improved method and apparatus for minimizing the inventory of tape that must be maintained in a tape cassette loading operation.

Another object of the present invention is to provide an improved method and apparatus for attaching leader material to a length of tape, the combination of which is to be placed within a tape cassette.

Yet another object of the present invention is to provide a method and apparatus for minimizing the degree of linear misalignment between a length of tape and the leader material attached thereto.

A further object of the present invention is to provide an improved method and apparatus for increasing the rate at which leadered tape can be loaded into a tape cassette.

Other objects, features and advantages of the present invention will be readily apparent from the following detailed description of the preferred embodiment thereof, taken in conjunction with the accompanying drawings.

SUMMARY OF THE INVENTION

In accordance with the present invention, an improved method and apparatus are provided for attaching leader material to a length of tape and winding the leadered tape onto spools within a single preleadered tape cassette or simultaneously within a plurality of such cassettes. The invention includes a reel of progressively formed composite tape comprising a series of cassette-length smaller tapes having their ends spaced a predetermined longitudinal distance from an adjacent cassette-length tape with said adjacent ends being attached by a piece of space-maintaining adhesive splice-tape. Each end of a length of leader material is prewound on one of the two spools rotatably mounted within a cassette housing. Means are provided for temporarily lifting an intermediate leader portion out of its cassette and then severing the leader into two smaller tape leader lengths. Means are provided for removing a cassette-length tape from a reel of composite tape formed of a plurality of such tapes by severing the adhesive splice-tapes at each end of a cassette-length tape and at approximately the center thereof, thereby leaving a portion of each splice-tape projecting beyond the tape surface end to which it is adhesively attached. Means are also provided for respectively pressing the severed ends of each smaller tape leader length against the adhesive surface of the said projecting splice-tapes at the ends of a cassette-length tape and for winding the tape and/or the adhesively attached leader onto a cassette spool after each such tape leader end to splice-tape surface attachment.

BRIEF DESCRIPTION OF THE DRAWINGS

FIGS. 4a–4k are a series of eleven schematic diagrams illustrating a tape leader attaching and tape cassette loading sequence employed in practicing a preferred embodiment of the present invention.

DESCRIPTION OF THE PREFERRED EMBODIMENTS

Figure 1:
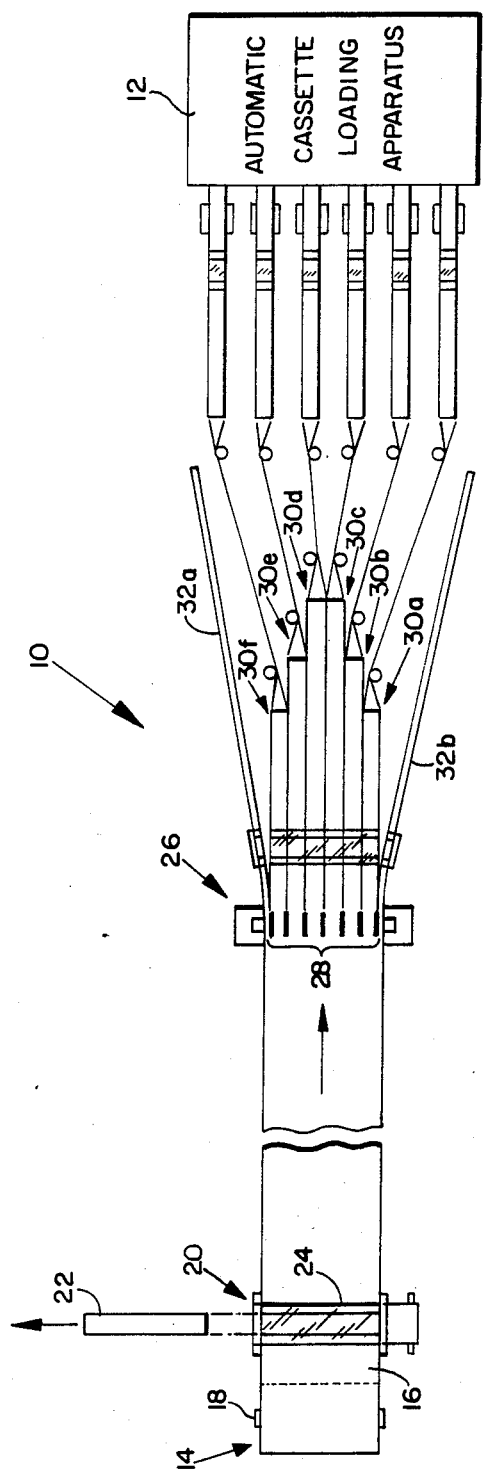
FIG. 1 is a top view schematic of a preferred embodiment of the composite-tape forming and cassette-loading apparatus of the present invention.

Referring now to the drawings, in FIG. 1 a top view schematic of a preferred embodiment of composite tape-forming apparatus 10 and automatic cassette-loading apparatus 12 of the present invention, is depicted. In FIG. 1, approximately $3\frac{1}{2}$ inch wide web roll 14 of magnetic tape 16 is clamped to rotatably mounted shaft 18. Roll of tape 14 would normally be much wider (60 inches). However, in order to facilitate describing this cassette loading concept, a relatively narrow width web roll has been employed. Web or tape 16 is initially moved into and temporarily held within workstation 20 where full width ($3\frac{1}{2}$ inch) and $\frac{1}{2}$ inch long rectangular section 22 is severed from said tape 16, with rectangular section 22 being cut at right angles to the longitudinal axis of said tape 16. Conventional vacuum clamps located within workstation 20 (not shown) temporarily clamp the severed ends of tape 16 immediately adjacent that portion from which rectangular section 22 is severed both before and after such severing occurs. Rectangular section 22 may be severed from tape 16 by a single conventional knife blade (not shown) making two successive spaced-apart passes or cuts through tape 16 or, preferably, by two parallel blades (not shown) mounted in fixed spaced-positions with respect to one another that make a single lateral pass through said tape 16. A conventional vacuum-type gripping device (not shown) is employed to physically remove rectangular section 22 once it has been severed from magnetic tape 16.

After rectangular section 22 has been removed from tape 16 and while the end of tape 16 immediately adjacent the space resulting from said removed section are maintained in a fixed position by the said vacuum clamps within workstation 20, one-inch wide splice-tape 24, having an adhesive coating on one side thereof, is placed over said space with its adhesive surface being pressed into firm contact with the said clamped adjacent magnetic tape 16 ends, thereby adhesively attaching said adjacent spaced-apart tape ends to one another and thereby forming a wide composite web section comprising said two spaced apart tape ends and said adhesive splice-tape 24. The size and placement of adhesive splice-tape 24 is such that it extends over the lateral edges of tape 16 and overlaps each adjacent tape 16 end by $\frac{1}{4}$ inch while maintaining the $\frac{1}{2}$ inch space produced by the removal of section 22. The specific means for applying splice-tape 24 to the intermediate clamped ends of tape 16 are conventional, therefore, the details of the splice-tape applying device have not been illustrated herein. Clamping the ends of tape 16 immediately adjacent removed section 22 in a fixed position while said section is being removed and while splice-tape 24 is being applied, aids in establishing the desired longitudinal alignment between these ends that must be maintained after they are unclamped and moved into a subsequent or remote workstation. The advantages derived from maintaining this alignment will be explained below.

Once splice-tape 24 has been applied to form a wide composite web-section, magnetic tape 16, together with splice-tape 24 adhesively attached thereto, is advanced toward tape-slitting workstation 26. As tape 16 moves through tape-slitting workstation 26, a plurality of knives 28 (seven) progressively slit or cut tape 16 into six adjacent $\frac{1}{2}$-inch wide relatively narrow width composite tapes 30a, 30b, 30c, 30d, 30e and 30f with each composite tape comprising a series of adhesively attached cassette length tapes. In addition, the outer edges of tape 16 and splice-tape 24 are formed into two continuous thin waste strips 32a and 32b as they are trimmed from said tape 16 by the outermost knives of said plurality of knives 28. After relatively narrow composite tapes 30a–30f have been slit from relatively wide tape 16, they are moved over several sets of tape positioning rollers into cassette-loading apparatus 12 for simultaneous insertion into a plurality of tape-handling cassettes. A perspective view of some of the plurality of cassettes being simultaneously loaded within automatic cassette loading apparatus 12 is shown in drawing FIG. 2.

Figure 2:
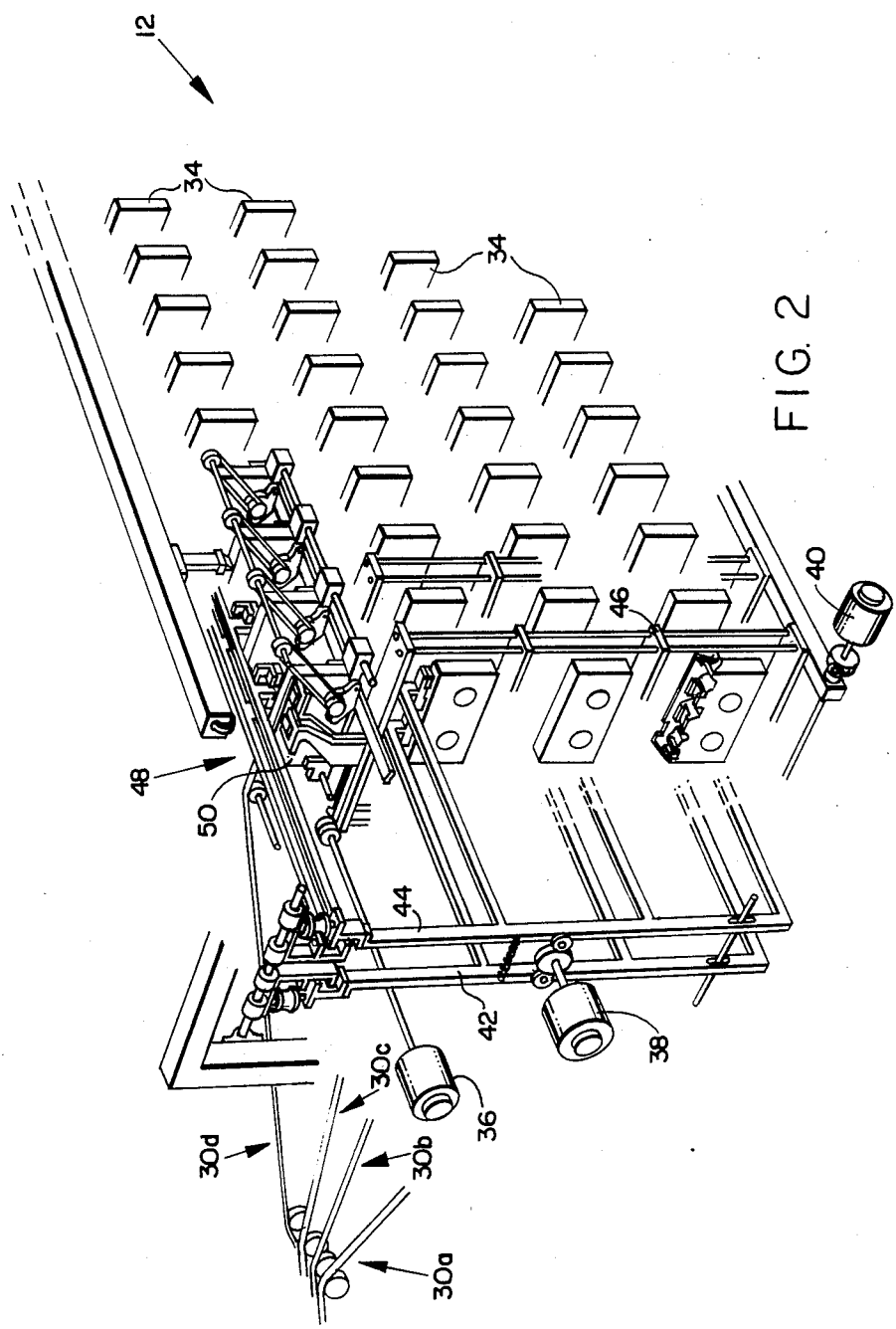
FIG. 2 is a perspective view of some of a plurality of cassettes being simultaneously loaded by the automatic cassette loading apparatus of the present invention.

In FIG. 2, a matrix-like array of cassettes 34 are shown with each of said cassettes being positioned within a different tape leader attaching and magnetic tape loading workstation. The term workstation has also been employed herein to refer to all of such workstations. Each cassette is of the commercially available preleadered type in that each end of a length of leader material is prewound onto a different one of the two spools rotatably mounted within a cassette housing. The apparatus for supporting a cassette within a workstation and for moving a cassette into and out of a workstation for cassette loading purposes is fairly conventional and, therefore, for convenience, this structure is not shown. As mentioned above, magnetic tape is simultaneously leadered and loaded into plurality of cassettes 34 after being positioned within their respective workstations within cassette loading apparatus 12. Forces generated by drive means such as winding-tape tension controlling magnetic clutches (not shown) driven by electrical motors 36, 38 and 40, for example, are simultaneously coupled to each workstation and to each workstation positioned cassette in said cassette 34 array through such linkages as 42, 44 and 46 for purposes that include cutting both leader material and adhesive splice-tape and for winding leadered tape onto a rotatably mounted cassette spool. Force generating electrical motors 36, 38, 40 and said linkages 42, 44, 46 coupling the forces generated by said electrical motors to the various workstations within loading apparatus 12 are of fairly conventional design and therefore, for convenience, the details of these devices/structures have also not been shown. As enlarged perspective view of cassette-loading workstations 48 which is one of the plurality of workstations shown in FIG. 2 is also shown in drawing FIG. 3.

Figure 3:
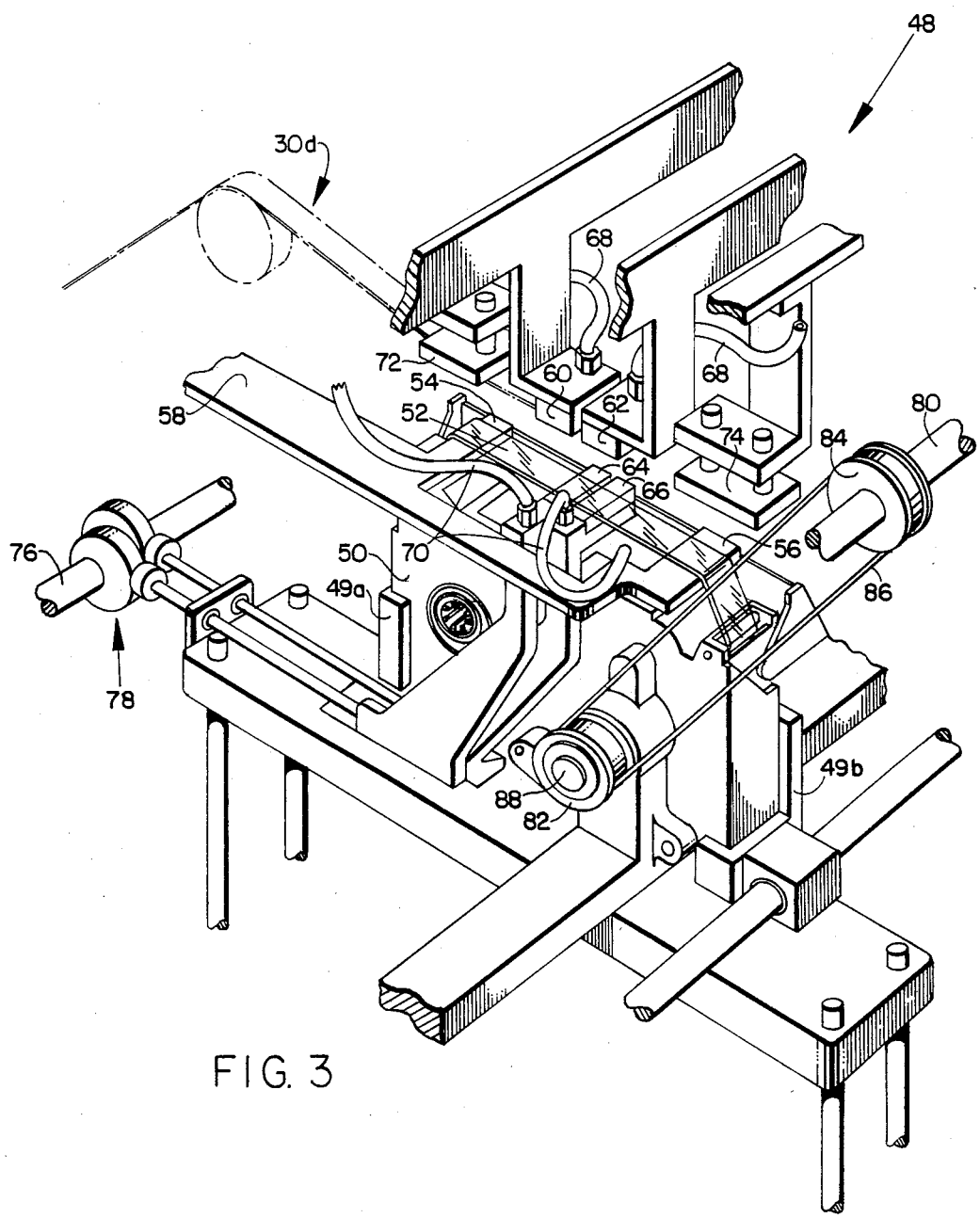
FIG. 3 is an enlarged perspective view of one of the cassette-loading workstations shown in drawing FIG. 2.

In FIG. 3, preleadered cassette 50, for example, is temporarily placed in a fixed position within workstation 48 by cassette clamping mechanism 49a and 49b at the same time that other preleadered cassettes of cassette array 34 (FIG. 2) are temporarily positioned within their respective cassette-holding workstations. An intermediate portion of leader strip 52 has been withdrawn from cassette 50 by blades 54 and 56 laterally projecting from leader extracting arm 58. At various times during the loading operation of cassette 50, magnetic tape 30d is temporarily vacuum-gripped by vacuum-supplied laminator chucks 60 and 62 and leader strip 52 is temporarily vacuum-gripped by vacuum-supplied leader chucks 64 and 66. Vacuum is supplied to chucks 60, 62, 64 and 66 from a vacuum source (not shown) through hoses 68 and 70 at various times of varying duration during the cassette loading cycle. Magnetic tape 30d and leader strip 52 are also periodically gripped between urethane faced clamp pads 72 and 74, and adjacent leader blades 54 and 56, respectively. Actuating forces for moving vacuum chucks 64 and 66 during the cassette loading operation are derived from shaft 76 through cam and cam follower assembly 78. Actuating forces for winding tape and tape leader material onto a spool within cassette 50 are derived from shaft 80 through pulleys 82 and 84, belt 86 and tape-winding shaft 88. Control of the vacuum being supplied to the tape-gripping vacuum clamps and of the various movable members employed to place leadered tape within a cassette is provided by fairly conventional control means and therefore the specific means for such control have not been illustrated herein. A series of schematic diagrams illustrating the preferred tape leader attaching and tape cassette loading sequence of the present invention is shown in drawing FIGS. 4a–4k.

Figure 4A:
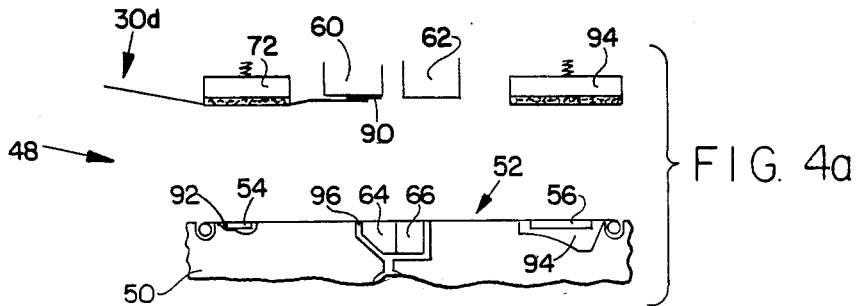

Turning now to drawing FIG. 4a, cassette 50 is shown temporarily clamped within cassette-loading workstation 48. For the purpose of initiating this description of this preferred cassette-loading process, it will be assumed that piece of splice-tape 90 has already been adhesively attached to and extends beyond the free end of composite tape 30d to form an adhesive lip and that this free end, together with splice-tape 90 is being vacuum gripped by laminator chuck 60. The precise manner of attaching a splice-tape such as splice-tape 90 in the formation of composite tape 30d is described below in detail. Also, leader blades 54 and 56 have been inserted into cassette recesses 92 and 94, respectively, and vacuum chucks 64 and 66 have been inserted into cassette recess 96, all below an intermediate portion of leader strip 52 whose ends are wound on spools (not shown) within cassette 50. FIG. 4a, in effect, shows the position of the various cassette and cassette loading components at the beginning of the tape loading process after preleadered cassette 50 has been placed into tape loading workstation 48, but before the actual tape-loading sequence has been initiated.

Figure 4B:
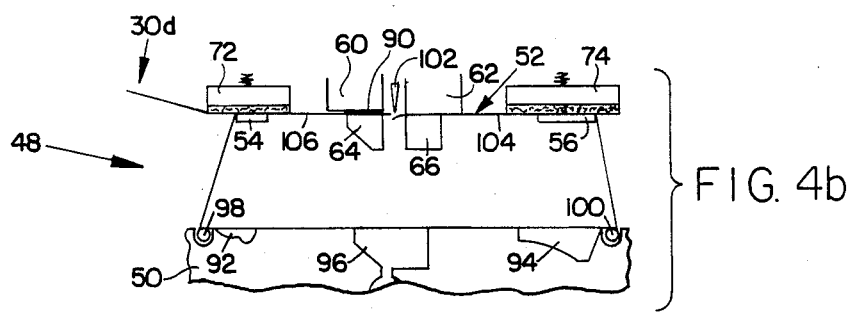

Once cassette 50 has been placed into workstation 48 and blades 54, 56 and chucks 64, 66 have been moved under an intermediate portion of leader strip 52 as shown in drawing FIG. 4a, said intermediate leader portion is mechanically released from cassette 50 by conventional means (not shown), pulled over rollers 98 and 100 and raised above said cassette 50 by said blades 54 and 56 and then temporarily clamped between said blade 54 and urethane faced clamp pad 72 and between said blade 56 and urethane based clamp pad 74 as shown in drawing FIG. 4b. In addition, and with reference to said drawing FIG. 4b, the center portion of said raised intermediate portion is also clamped between laminator chuck 60 and leader chuck 64 and between laminator chuck 62 and leader chuck 66 after said leader chucks 64 and 66 have been laterally separated a predetermined distance from one another. Also, vacuum being supplied to chucks 64 and 66 grip those portions of leader strip 52 immediately adjacent and in contact with the upper surfaces of said leader chucks 64 and 66. Once the said intermediate portion of leader strip 52 has been so clamped, knife 102 is moved down between spaced-apart laminator chucks 60, 62 and between spaced-apart leader chucks 64, 66 to thereby sever leader strip 52 into two separate shorter leader lengths, designated forward leader 104 and trailing leader 106 with an end of each shorter leader length being wound on a different cassette spool within cassette 50 as previously explained.

Figure 4C:
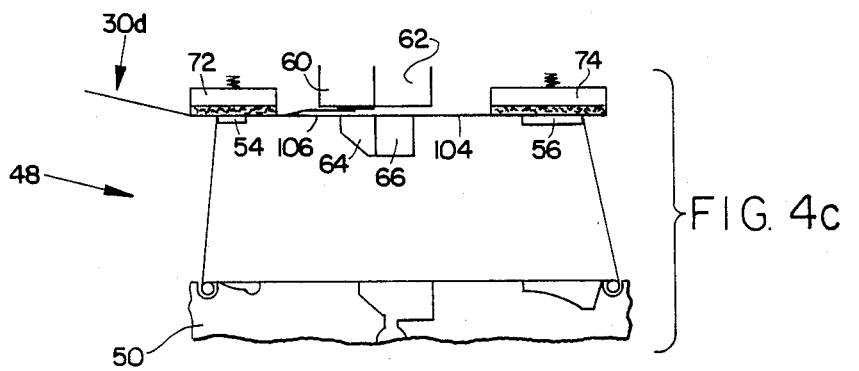

As shown in drawing FIG. 4c, after leader strip 52 has been severed into two separate shorter lengths 104 and 106 by knife 102, laminator chucks 60 and 62 are moved together and then moved away from their respective adjacent newly-severed leader ends. When chuck 60 is so moved, it continues to hold the splice-tape 90 end of composite tape 30d against its bottom surface by means of vacuum through a vacuum port supplied to said chuck 60 from a previously discussed remote vacuum source. Also, leader chucks 64 and 66 are moved together in butting engagement until the end of each leader portion 104 and 106 is aligned with the edge of the butting end of its respective adjacent leader chuck.

Figure 4D:
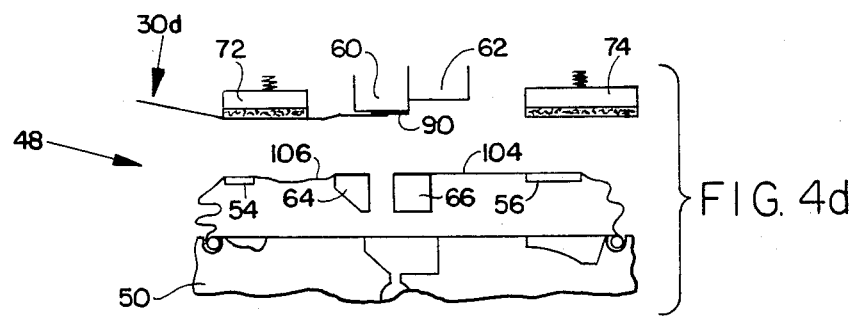

After the edges of the severed intermediate ends of leader portions 104 and 106 have been so aligned, blades 54, 56 and leader chucks 64, 66 are lowered, thereby removing the mechanical or friction clamps on forward leader 104 and trailing leader 106 provided by clamp pads 72 and 74 as shown in drawing FIG. 4d. With reference to drawing FIG. 4d, laminator chucks 64, 66 together with the vacuum gripped ends of forward leader 104 and trailing leader 106 are also lowered, spaced from one another and moved to the left in preparation for the adhesive attachment of the end of forward leader 104 to that portion of splice-tape 90 projecting beyond the end of composite magnetic tape 30d. In addition, laminator chuck 62 is raised to avoid any potential interference with the forward leader 104 to magnetic tape 30d attachment process.

Figure 4E:
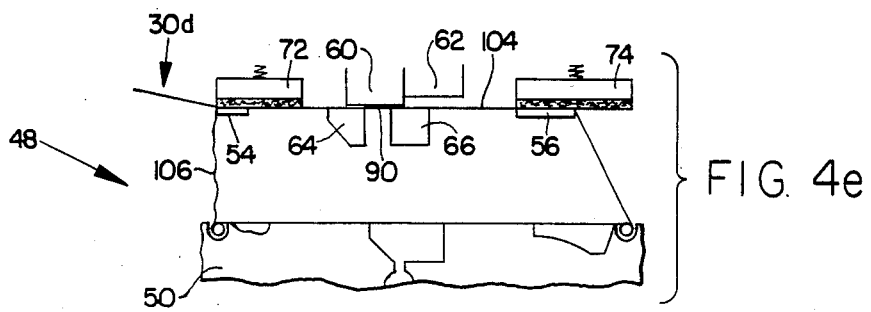

FIG. 4e schematically illustrates the actual forward leader 104 to magnetic tape 30d attachment process. As shown in drawing FIG. 4e, blades 54 and 56 raise trailing leader 106 and forward leader 104, respectively, until outer portions of said leaders 104 and 106 are held between clamp 72 and blade 54 and between clamp 74 and blade 56. Simultaneously therewith, leader chuck 66 is raised and laminator chuck 60 is lowered until the adhesive lip or that adhesive surface portion of splice-tape 90 extending beyond the end of magnetic tape 30d is firmly pressed against the upper surface at the free end of forward leader 104, thereby adhesively attaching said forward leader 104 end to said tape 30d and in essentially perfect longitudinal alignment therewith.

Figure 4F:
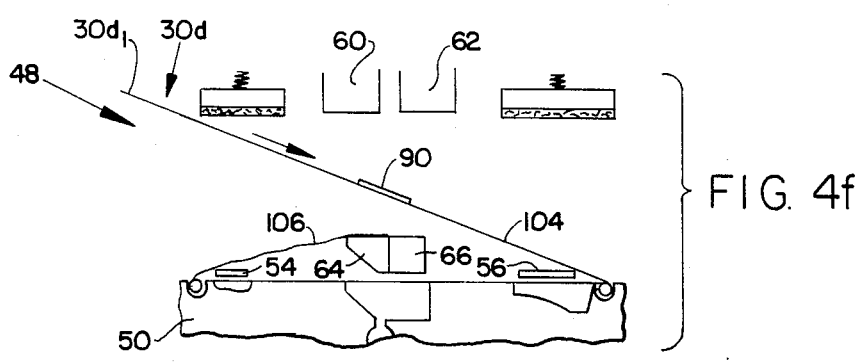

Referring now to drawing FIG. 4f, once forward leader 104 is adhesively attached to the end of composite tape 30d, blades 54, 56 and chucks 64, 66 are lowered, thereby removing all of the clamps on said tape 30d and forward leader 104 within workstation 48. Once these clamps are removed, forward leader 104 together with portion $30d_1$ of composite magnetic tape 30d that extends from splice tape 90 to the next splice-tape (105 in FIG. 4g) of composite magnetic tape 30d, are wound onto a spool within cassette 50 by spool winding shaft 88 (FIG. 3). In addition, laminator chuck 62 is lowered until its bottom surface is roughly coplanar with the bottom surface of laminator chuck 60.

Figure 4G:
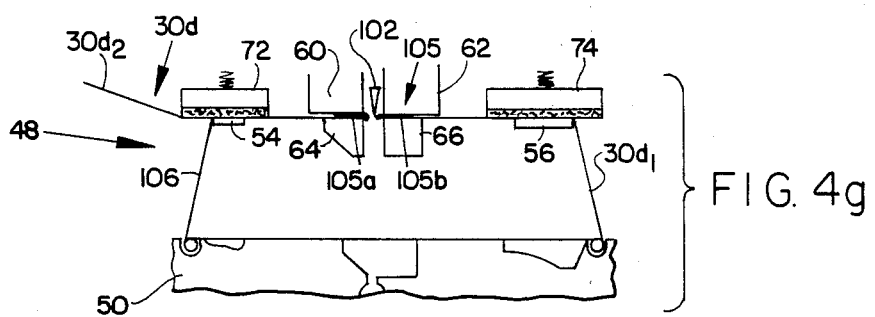

With reference to FIG. 4g of the drawings, after length $30d_1$ of composite magnetic tape $30d$ has been wound onto a spool within cassette 50, blades 54 and 56 are raised, thereby clamping an end portion of length of magnetic tape $30d_1$ between said blade 56 and clamp pad 74 and an end of the next or adjacent length of magnetic tape $30d_2$ of composite magnetic tape $30d$ together with trailing leader 106 between said blade 54 and clamp pad 72 such that splice-tape 105 that adhesively attaches magnetic tape length $30d_1$ to magnetic tape length $30d_2$ is adjacent the bottom surfaces of laminator chucks 60 and 62 and centered on the space between said chucks 60 and 62. Simultaneously with the raising of blades 54 and 56, leader chucks 64 and 66 are separated and raised until adhesive splice-tape 105 is tautly clamped between laminator chucks 60, 62 and leader chucks 64, 66. Once adhesively coated splice-tape 105 is so held, knife 102 is moved down between spaced-apart laminator chucks 60, 62 and between spaced-apart leader chucks 64, 66 to thereby sever splice-tape 105 into two separate and fairly equal pieces 105a and 105b such that each severed portion of said splice-tape 105 forms an adhesive lip in that they extend beyond the length of magnetic tape to which they are adhesively attached.

Figure 4H:
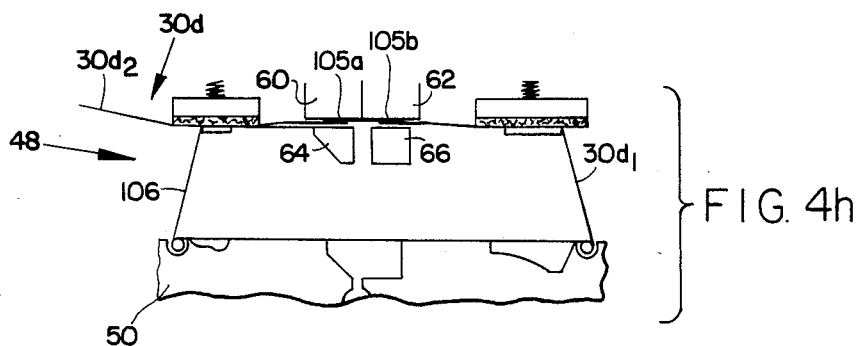

As shown in drawing FIG. 4h, after adhesive splice-tape 105 has been severed into separate pieces 105a and 105b by knife 102, laminator chucks 60 and 62 are moved together to engage one another at the place where splice-tape 105 was severed and are also moved upward and away from leader chucks 64, 66 to thereby remove the mechanical clamps on magnetic tapes $30d_1$ and $30d_2$ in the region of splice-tape 105. When chucks 60 and 62 are moved upward and away from leader chucks 64, 66, the newly formed ends of adhesive lips of the just-severed splice-tape 105 are held against an adjacent bottom surface of laminator chucks 60 or 62 by vacuum through vacuum ports supplied to said chucks from a remote vacuum source. The free end of trailing leader 106 continues to be firmly held, by vacuum, to the upper surface of leader chuck 64.

After laminator chucks 60 and 62 are moved together and engage one another at the place where splice-tape 105 was severed into portions 105a and 105b, blades 54, 56 are lowered and moved to the right as shown in FIG. 4i in preparation for the adhesive attachment of trailing leader 106 to the trailing end of magnetic tape $30d_1$. Vacuum being supplied to laminator chuck 62 and laminator chuck 60 continue to respectively hold splice-tapes 105b and 105a against their bottom surfaces. In addition, laminator chuck 60 is raised in order to avoid any potential interference with the trailing leader 106 to magnetic tape $30d_1$ attachment process.

FIG. 4j schematically illustrates the actual trailing leader 106 to magnetic tape $30d_1$ attachment process. As shown in FIG. 4j, blades 54, 56 raise trailing leader 106 and magnetic tape $30d_1$, respectively, until a portion of trailing leader 106 is held between said blade 54 and clamp 72 and a portion of magnetic tape $30d_1$ is held between said blade 56 and clamp 74. Simultaneously therewith, leader chuck 64 is raised and laminator chuck 62 is lowered until that adhesive surface portion or lip of severed splice-tape 105b extending beyond the trailing end of magnetic tape $30d_1$ is firmly pressed against the upper surface of the free end of vacuum-gripped trailing leader 106, thereby adhesively attaching trailing leader 106 to said tape $30d_1$ and in essentially perfect longitudinal alignment therewith.

After trailing leader 106 has been adhesively attached to magnetic tape length $30d_1$, blades 54, 56 and leader chucks 64, 66 are removed from beneath leader 106 or tape $30d_1$, the vacuum grip on severed adhesive tape 105b is released and the leadered end of tape $30d_1$ is wound further onto the magnetic-tape holding spool within cassette 50 as schematically shown in drawing FIG. 4k until the trailing end of magnetic tape $30d_1$ and trailing leader 106 are fairly taut, with severed splice-tape 105b being positioned either adjacent the housing of cassette 50 or wound onto an internal cassette 50 spool. Laminator chucks 60 and 62 are raised and separated from one another and splice-tape 105a, adhesively attached to the free end of magnetic tape length $30d_2$ remains vacuum gripped by the vacuum ports (not shown) on the bottom surface of laminator chuck 60. The relationship of magnetic tape $30d_2$ and splice-tape 105a attached thereto with respect to laminator chuck 60 and cassette 50 as shown in drawing FIG. 4k are the same as the corresponding components in the schematic diagram shown in FIG. 4a and are placed in these relationships in precisely the same manner. Also, the above-described cassette loading sequence is identical to that in all of the other workstations containing the matrix-like array of cassettes 34 (FIG. 2) and occur simultaneously therewith in said other workstations. Sets of adjacent narrow tapes are simultaneously severed from the progressively slit narrow composite web tapes with each individual narrow tape being similarly loaded into a separate cassette in the above-described manner. After each tape in the forwardmost or end set of adjacent narrow tapes are so similarly loaded, the following or next in line set of adjacent narrow tapes are simultaneously loaded into their respective tape cassettes, subsequently positioned to tape loading workstations within tape loading apparatus 12 (FIG. 1). This process is repeated until all of the composite web tapes have been wound into tape handling cassettes. At that point in the tape loading process, a new wide roll of tape is placed on rotatably mounted shaft 18 in tape forming apparatus 10 and then the composite tape forming process is repeated in the manner described above.

DISCUSSION

Composite tape $30d$ described above in the preferred embodiment of the present invention consists of a series of splice-tape connected cassette-length tapes formed a short time before being loaded into an individual tape cassette. Advantages flowing from such an arrangement are absence of a plurality of complicated adhesive tape forming and tape attaching mechanisms in each of a plurality of cassette loading workstations, absence of a need for an inventory and handling of reels of cassette width tapes for loading into automatic cassette loading apparatus and the ability to simultaneously load a plurality of tape cassettes for a period of time limited only by the length of the relatively large width roll of tape from which the composite tapes are formed.

Cassettes loaded by means of the tape loading apparatus of the present invention are indistinguishable by the equipment in which they are employed from those produced by said presently available tape winding apparatus. In addition, presently available cassette loading apparatus require that a relatively large inventory of reels of proper width tape be available before the cassette loading process is initiated. In addition, these reels of tape are normally manually loaded into a plurality of individual tape winders at different times and therefore will empty at different times during the collective tape loading process which necessarily limits the number of tape-cassettes that can be loaded by a plurality of individual tape winders in any given time interval. As explained above with respect to the present invention, a plurality of proper width tapes are slit from a roll of tape of considerably larger width to form a plurality of composite tapes, as defined above, just before the actual cassette loading sequence is initiated. By forming the tape in this manner and subsequently severing adhesively connected cassette-length portions therefrom for cassette loading purposes, it insures that each of the tapes being supplied to a plurality of interconnected tape loading workstations will run out at the same time because of the composite tapes being simultaneously cut from the same roll thereby substantially reducing the number of times that tape must be loaded into a tape winding machine.

The degree of longitudinal alignment between a magnetic tape, for example, and the leader material attached to each end of the tape is controlled by an industry-wide specification or standard in order to insure that the cassettes and the tape and leader material loaded into said cassettes produced by a variety of different tape-cassette manufactures are compatible with the equipment in which they are to be employed. Excessive misalignment between a tape, tape leader and/or the adhesive splice-tape employed to attach said tape to its tape leader may cause excessive friction loading of the tape-drive system in, for example, magnetic tape type recording equipment by preventing said tape from moving past the recording head at the proper rate of speed and thereby interface with the recording process.

When cassettes are loaded by presently available tape loading apparatus such as the Otari tape loading machine mentioned above, there is considerable lateral movement of the tape and tape leader with respect to each other during the leader attaching/tape loading process. In addition, the piece of adhesive splice-tape employed to attach leader material to the tape during the process must be die cut and fairly accurately positioned by the tape loading machine in order to meet the above-mentioned industry-wide tape-cassette specifications. While presently available tape-cassette loading apparatus are able to meet these specifications, they do so with a great deal of difficulty. By contrast, the tape loading method and apparatus of the present invention does not require lateral movement between tape and tape leader, already has the adhesive splice-tape attached to the magnetic tape when the cassette is actually being loaded with leadered tape and therefore does not have to face the relatively difficult tape to tape leader alignment problems encountered by presently available tape loading apparatus.

It will be apparent to those skilled in the art from the foregoing description of my invention that various improvements and modifications can be made in it without departing from its true scope. The embodiments described herein are merely illustrative and should not be viewed as the only embodiments that might emcompass my invention.

What is claimed is:

1. In a method of attaching webs to leaders, the improvement comprising the steps of:
   clamping two lengthwise spaced apart portions of said web;
   severing a section intermediate said spaced apart portions of said web from said web, said section having a given length and extending fully across said web;
   connecting said two spaced apart web portions to one another with an adhesive tape extending across the space provided by said severed web section; and
   severing said adhesive tape intermediate said two spaced apart web portions to provide a pair of adhesive lips extending beyond the ends of respective said spaced apart web portions, said adhesive lips thus being available to be adhered to ends of leaders.

2. In a method of simultaneously loading a plurality of elongated relatively narrow tapes, each being of given width and given length, into a respective plurality of cassettes, each said cassette containing a pair of spools and a leader strip extending between said spools with its opposite ends attached to respective said spools, the improvement comprising the steps of:
   providing a relatively wide composite section of a web havng a width equivalent to the combined widths of said plurality of narrow tapes, said wide composite web section comprising a first tape portion spaced lengthwise of said web from a second tape portion and joined together by a strip of adhesive tape extending across the entire width of said wide composite web section;
   providing a work station wherein said plurality of cassettes are positioned and said leader strip of each said cassette may be substantially simultaneously severed to provide a forward leader and a trailing leader;
   advancing said web toward said work station;
   slitting said web, including said composite section thereof, lengthwise to progressively form a plurality of relatively narrow composite web tapes each comprising one said narrow tape, as said web is being advanced toward said work station;
   simultaneously severing the forwardmost set of adjacent narrow tapes from said narrow composite web tapes by substantially simultaneously severing the slitted strips of adhesive tape attached to said forwardmost set of adjacent narrow tapes in a manner to provide an adhesive lip extending from the trailing edge of each of said adjacent narrow tapes of said forwardmost set as well as an adhesive lip extending from the leading edge of the next-in-line set of progressively formed adjacent narrow tapes, whereby, within said work station, previously similarly formed adhesive lips extending from the leading edges of said forwardmost set of adjacent narrow tapes may be simultaneously adhered to respective forward leaders of said plurality of cassettes and said adhesive lips extending from the trailing edges of said forwardmost set of adjacent narrow tapes may be later subsequently adhered to respective trailing leaders of said plurality of cassettes.

3. Apparatus for simultaneously loading tape into a plurality of cassettes having opposite ends of a length of leader material attached to a pair of rotatably mounted spools within each of said cassettes, comprising:
   means for establishing a series of composite tape sections in a length of relatively wide tape at predetermined equally spaced intervals along the length of said tape wherein said composite tape sections consist of adjacent ends of relatively short intermediate tape-length portions spaced a predetermined distance from one another and joined together by an adhesive splice tape;

means for progressively slitting said composite tape sections containing wide tape together with the splice tapes adhesively attached thereto, along the length of said tape, into a plurality of separate composite tapes in the form of a series of shorter, equal length, narrow width tapes adhesively attached to adjacent shorter tape-length portions;

means for simultaneously severing a plurality of adhesive splice tapes in each of said plurality of separate tapes into two separate portions such that an adhesive surface in each severed portion extends beyond the tape surface end to which a severed splice tape portion is adhesively attached;

means for simultaneously severing the leader material within each cassette into two separate portions; and means for simultaneously pressing one and then the other intermediate severed ends of leader material of each cassette against the adhesive surface extending beyond opposite ends of a respective one of a smaller tape-length portion severed from a separate one of said plurality of composite tapes.

4. A method of attaching a leader to a web, comprising the steps of:

clamping portions of said web in at least two spaced-apart locations;

severing adjacent clamped web portions from one another thereby establishing a space of predetermined width between said severed web portions;

connecting said severed and spaced web portions to one another with adhesive tape while said clamped web portions are retained at said spaced-apart locations;

severing said adhesive tape into two separate portions such that an adhesive surface of each severed portion extends beyond the web end to which a severed adhesive tape portion is adhesively attached; and pressing a surface at the end of a leader against that portion of an adhesive tape surface extending beyond its associated web end to thereby attach said leader to said web end.

5. A method of attaching leader material to opposite ends of a tape, comprising the steps of:

(a) clamping said tape at two spaced-apart locations within a particular workstation;

(b) severing adjacent clamped web portions from one another thereby establishing a space of predetermined width between said severed web portions located at said workstation;

(c) connecting said severed and spaced web portions to one another with adhesive tape while said clamped web portions are retained in said spaced relation at said workstation;

(d) severing said adhesive tape into two separate portions such that an adhesive surface of each severed portion extends beyond the tape surface end to which a severed adhesive tape portion is adhesively attached;

(e) pressing a surface at the end of a length of leader material against that portion of an adhesive tape surface extending beyond its associated tape end;

(f) unclamping said tape and advancing a portion of same spaced a predetermined length from the just leadered end thereof to within said workstation and then repeating steps (a) through (d); and (g) pressing a surface at the end of another length of leader material against that portion of an adhesive tape surface extending beyond the advanced leadered tape end.

6. A method of loading tape into a cassette having opposite ends of a length of leader material attached to a pair of rotatably mounted spools within said cassette, comprising the steps of:

(a) clamping said tape at two spaced-apart locations within a particular workstation;

(b) severing adjacent clamped web portions from one another and establishing a space of predetermined width between said severed web portions located at said workstation;

(c) connecting said severed and spaced web portions to one another with an adhesive splice tape while said clamped web portions are retained in said spaced relation at said workstation;

(d) unclamping said tape and advancing another portion of same spaced a predetermined length from its adhesively taped end, to within said workstation;

(e) repeating steps (a) through (d) for a number of times equal to the additional cassettes to be loaded;

(f) advancing an adhesive-tape splice into another workstation and severing said splice into two separate portions such that an adhesive surface of each severed portion extends beyond the tape surface end to which a severed splice tape portion is adhesively attached;

(g) clamping an intermediate portion of said cassette leader at two spaced-apart locations within said other workstation and then severing said leader between said clamped locations;

(h) pressing a surface at the severed end of leader material wound on one of said spools against that portion of an adhesive tape surface extending beyond its associated tape end;

(i) unclamping said tape and the leader adhesively attached thereto and winding said leadered tape onto a cassette spool until the next adjacent splice tape is within said other workstaion;

(j) severing the splice tape within said other workstation into two separate portions such that an adhesive surface of each severed portion extends beyond the tape surface end to which the splice tape portion is adhesively attached;

(k) pressing a surface at the severed end of leader material attached to the other cassette spool against that portion of an adhesive tape surface on the leadered tape extending beyond its associated tape end; and (l) unclamping the leader and leadered tape, winding said leadered tape onto one of said cassette spools and then repeating steps (f) through (l) for a number of times equal to the number of additional cassettes to be loaded.

* * * * *